Figure 7:
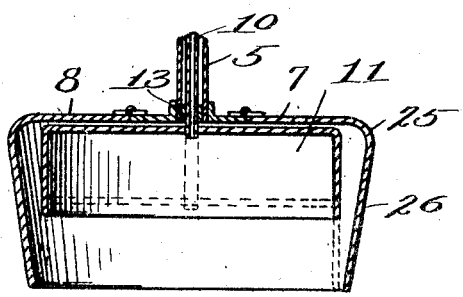

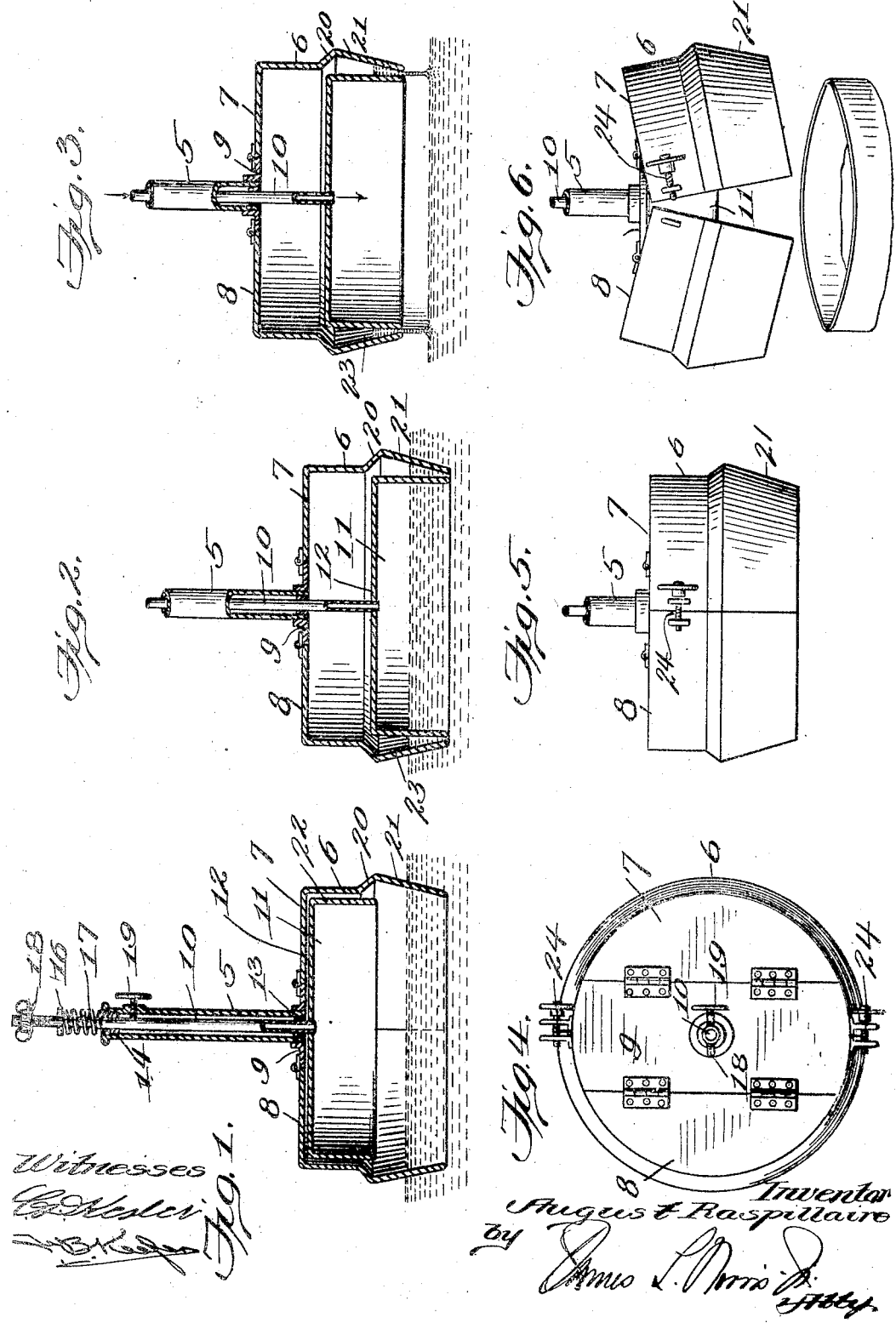

A. RASPILLAIRE.
BAIT FOR GLASS DRAWING APPARATUS.
APPLICATION FILED APR. 5, 1912.

1,100,617.

Patented June 16, 1914.
2 SHEETS—SHEET 2.

Witnesses:

Inventor
August Raspillaire
by
Atty.

UNITED STATES PATENT OFFICE.

AUGUST RASPILLAIRE, OF MORGANTOWN, WEST VIRGINIA, ASSIGNOR OF ONE-HALF TO WALTER A. JONES, OF COLUMBUS, OHIO.

BAIT FOR GLASS-DRAWING APPARATUS.

1,100,617.

Specification of Letters Patent. Patented June 16, 1914.

Application filed April 5, 1912. Serial No. 688,729.

*To all whom it may concern:*

Be it known that I, AUGUST RASPILLAIRE, a citizen of the United States, residing at Morgantown, in the county of Monongalia and State of West Virginia, have invented new and useful Improvements in Baits for Glass-Drawing Apparatus, of which the following is a specification.

This invention relates to apparatus for drawing cylinders and hollow glass articles from molten glass and particularly to what is known as "baits", and the primary object of the same is to provide a simple and effective means for reliably drawing hollow glass articles from a mass of molten glass and to prevent cracking or breaking of the glass at the "bait" due to contraction and expansion, and thereby eliminate the possibility of a cylinder, for instance, falling off the bait during the drawing operation, and also obviating the necessity of forming a "neck" and a "cap" on the cylinder to be drawn and thus facilitate the operation of glass drawing, with less waste in the trimming of the cylinder or hollow article.

With these and other objects and advantages in view the invention consists in the construction and arrangement of the several parts hereinafter more fully described and claimed in preferred form.

In the drawings preferred embodiments of the invention are disclosed, but it will be understood that variations in the shape and other detail features of the bait organization may be adopted within the scope of the claims.

Figure 8:
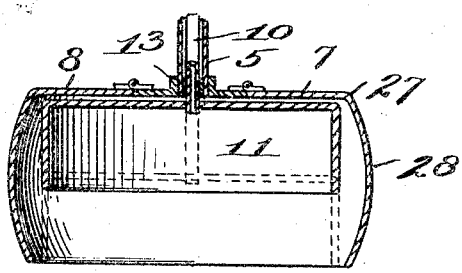
Figure 9:
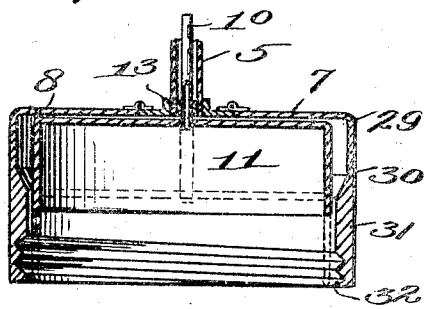

Figures 1, 2 and 3 are sectional elevations of a bait embodying the features of the invention and showing the parts thereof in different positions. Fig. 4 is a top plan view of the bait. Fig. 5 is a side elevation of the same. Fig. 6 is a side elevation of the bait shown open and as having released a glass cylinder illustrated in part below the said figure. Fig. 7 is a sectional elevation showing a modified form of the bait. Figs. 8 and 9 are views similar to Fig. 7 and respectively showing further modifications in the form of the bait.

Referring to Figs 1, 2, 3, 4, 5 and 6 of the drawings, the numeral 5 designates an outer tube having a head 6 secured thereto and comprising hinged sections 7 and 8, the top 9 of the head being closed except at the center, which will be more fully hereinafter explained. A tube or blowing pipe 10 is movably mounted within the tube 5 and has a head 11 fixed to the lower end thereof, the said head 11 having a closed top 12 and an open bottom. The inner tube or blowing pipe 10 movably extends through a bearing 13 fitted in a suitable bore in the center of the closed top 9 of the head 6, and in the upper end of the outer tube 5 is another similar bearing 14 through which the inner tube 10 also slidably projects. On the tube 10 above the upper end of the tube 5 a suitable distance is a collar or washer 16, and between the latter and the upper end of the tube 5 a coiled spring 17 surrounds the tube 10. On the inner tube or blowing pipe 10 above the collar or washer 16 a stop nut 18 is adjustably mounted to limit the downward movement of the said tube 10 when released by a brake device or set screw 19 having bearing in the outer tube 5 near the top of the latter and adapted to engage the inner tube 10, as shown by Fig. 1. When the inner tube or blowing pipe 10 is released and with its head falls or gravitates, the spring 17 acts as a cushion to obviate shock or jar. The head 6 of the outer tube 5, as shown by Figs. 1 to 6 both inclusive, is illustrated as having an intermediate offset 20, and from this offset the wall extends downwardly and inwardly at a slight angle of inclination as at 21, whereas the side wall 22 of the inner head 11 is straight so that when the inner head is lowered relatively to the outer wall 21 of the head 6, an inverted triangular pocket 23 is formed, as particularly shown by Fig. 2. It will be seen that the diameter of the head 11 is considerably less than the diameter of the lower portion of the wall 21 of the head 6, and when the bait as a whole is lowered or dipped into the molten glass the latter flows up between the two walls and the portion of the glass above the lower edges of the heads 6 and 11 is of greater thickness than the glass located between said edges and a positive retention means for the cylinder or tubular member drawn by the bait is thus provided, with advantages in retaining the upper extremity of the drawn cylinder intact with the bait. The surrounding side wall or shell of the head 6 is formed of two equal sections, and the top closures 7 and 8 of these sections are of less extent than the sections and are hinged to the intermediate top member 9 to which the outer tube 5 is secured, and when the bait is arranged for dipping into the molten glass the sections of the side wall or shell of the head 6 are secured in fixed closed position by coupling screws 24 having suitable turn-heads, as shown by Fig. 4. When it is desired to release the bait from the tubular article drawn thereby, as shown by Fig. 6, the coupling screw 24 is released and the sections of the side wall or shell of the head 6 may then be readily opened.

In Figs. 7, 8 and 9 modifications of the head of the outer tube 5 are shown, the remaining parts being of the same structure and arrangement as illustrated by Figs. 1 to 6, both inclusive. The head 25, as shown by Fig. 7, has a side wall or shell 26 gradually inclining inwardly in a straight line from the upper portion of the head to the lower edge of the same. In Fig. 8 the head 27 of the outer tube 5 has its side wall 28 of concavo-convex form, and in the modification shown by Fig. 9 the head 29 of the outer tube 5 has its side wall 30 vertically straight and increased in thickness at its lower portion as at 31, the lower extremity of the thickened portion of the wall being screw-threaded as at 32, and when the inner head 11 drops the molten glass is forced into the threads. In removing the cylinder from the modified form of the bait as shown by Fig. 9 the same course may be pursued as with the other baits illustrated, or it may be accomplished by unscrewing the bait from the threaded end of the cylinder provided by the threads 32 at the lower end of the head 29.

In the operation of the bait it will be understood that it is cool when dipped into the molten glass, and in the dipping operation the inner head 11 is elevated, as shown by Fig. 1, and then released and dropped, as shown by Fig. 2, to trap and hold the glass between the two heads, the glass being instantly chilled by the contact of the cool metal therewith, and as soon as the bait is drawn upwardly or out of the molten glass the lining of glass between the two heads 6 and 11 is rigid and cannot slip off or loosen relatively to the heads, even though the inner head might be drawn upwardly at that time. The positive retention of the glass between the two heads 6 and 11 is due in a large measure to the contracted portion of the pocket between the heads adjacent the lower edges of the latter, and in the form shown by Fig. 9 the threads 32 serve to retain the glass as hereinbefore explained. When the cylinder or other tubular device is drawn upwardly the desired height, it is severed from the molten glass in the usual manner known to the art, and the outer head 6 is then opened by releasing the screw 24 and the cylinder is liberated and removed from the bait, as shown by Fig. 6.

It will be understood that during the drawing action the usual operation will be pursued through the inner tube or blowing pipe 10. Cracking or breaking of the glass at the bait due to contraction and expansion is prevented and the operation of drawing a glass cylinder or hollow device may be rapidly carried on with less waste in the trimming of the cylinder or hollow device owing to the fact that it is unnecessary to form a "neck" and "cap."

It will be understood that suitable material will be employed in the formation of the parts of the bait, and, further, that changes in the proportions and dimensions may be adopted at will.

What is claimed is:

1. A bait for glass drawing apparatus comprising an outer head embodying upwardly opening hinged sections, the latter when closed forming a side wall against which the glass drawn is clamped, an inner head of less dimensions than and vertically movable within and inclosed by the outer head, the inner head having a straight side wall and normally elevated when the bait is brought in contact with the glass and then depressed to clamp the glass against the wall of the outer head, and means connected to the two heads for operatively supporting them.

2. A bait for glass drawing apparatus comprising an outer head embodying upwardly opening hinged sections fully open at their bottom portions and flaring upwardly from their lower edges, an inner head with a straight side wall of less dimensions than and vertically movable in and inclosed by the outer head, and supporting means connected to the two heads.

3. A bait for glass drawing apparatus comprising two heads, the outer head being fully open at the bottom and having an upward flare from the lower edge thereof and the inner head movably mounted in the outer head and formed with a vertically straight side wall, the side walls of the two heads uniting to form glass retaining means between them.

4. A bait for glass drawing apparatus comprising an outer head having a tube connected to the top portion thereof, an inner head vertically movable in the outer head to take up and hold glass between the two heads, the inner head being provided with a tube connected thereto and extending upwardly through the tube of the outer head and serving as a blow pipe, means for holding the inner tube against movement in the outer tube, a stop on the inner tube above the outer tube, and resilient means interposed above the upper end of the outer tube and a portion of the inner tube to cushion the latter in its lowering movement.

5. A bait for glass drawing apparatus comprising an outer head open at the bottom, a head vertically movable in the outer head and also open at the bottom, the side walls of the two heads being shaped and relatively coöperating to retain the glass therebetween during the drawing operation and to release the glass subsequent to the drawing operation, and means connected to the two heads for holding them in operative association.

In testimony whereof I have hereunto set my hand in presence of two subscribing witnesses.

AUGUST RASPILLAIRE.

Witnesses:
R. C. WOOD,
R. P. BAKER.

Copies of this patent may be obtained for five cents each, by addressing the "Commissioner of Patents, Washington, D. C."